(12) United States Patent
Jha et al.

(10) Patent No.: US 11,544,297 B2
(45) Date of Patent: Jan. 3, 2023

(54) COMPUTER-BASED METHOD AND SYSTEM FOR URBAN PLANNING

(71) Applicant: QUANTELA INC, Milpitas, CA (US)

(72) Inventors: Sanjiv Kumar Jha, Bangalore (IN); Vikash Shivhare, Madhya Pradesh (IN); Sumedh Ghatage, Kolhapur (IN); Shubham Agarwal, Uttar Pradesh (IN); Priyanka Kumari Choudhary, Bangalore (IN); Ameya Datar, Vidisha (IN); Musalaiah Pemmadi, Andhra Pradesh (IN)

(73) Assignee: QUANTELA INC, Milpitas, CA (US)

( * ) Notice: Subject to any disclaimer, the term of this patent is extended or adjusted under 35 U.S.C. 154(b) by 502 days.

(21) Appl. No.: 16/735,420

(22) Filed: Jan. 6, 2020

(65) Prior Publication Data

US 2021/0209136 A1 Jul. 8, 2021

(51) Int. Cl.
*G06F 16/29* (2019.01)
*H04W 4/021* (2018.01)
*G06F 16/587* (2019.01)
*G06V 20/10* (2022.01)

(52) U.S. Cl.
CPC ............ *G06F 16/29* (2019.01); *G06F 16/587* (2019.01); *G06V 20/176* (2022.01); *G06V 20/182* (2022.01); *G06V 20/188* (2022.01); *H04W 4/021* (2013.01)

(58) Field of Classification Search
CPC ............................ G06F 16/29; G06F 16/587
See application file for complete search history.

(56) References Cited

U.S. PATENT DOCUMENTS

2017/0308549 A1* 10/2017 Sims .................... G06Q 50/167

* cited by examiner

*Primary Examiner* — Baoquoc N To
(74) *Attorney, Agent, or Firm* — Shook, Hardy & Bacon L.L.P.

(57) ABSTRACT

Computer-based method and system for urban planning of a facility are described herein. The method and system facilitate a user, without any hard knowledge of geographic information system (GIS) to perform quick geo-spatial analysis with a fully automated, single step, and single input process including automatically determining one or more criteria corresponding to the facility based on the facility type defined by the user, automatically performing data analysis on a plurality of data-sets, automatically determining and presenting at least one suitable site within the geographic area for the facility based on the data analysis.

25 Claims, 10 Drawing Sheets

Proximity Analysis Criteria

| | Criteria | Sub-criteria distance (m) | Rank | Classification |
|---|---|---|---|---|
| 1 | Existing Shopping Malls | 0-1000<br>1000-1500<br>1500-2000<br>>2000 | 1<br>2<br>3<br>4 | Unsuitable<br>Poor suitable<br>Moderate<br>suitable |
| 2 | Distance from Police Station | 0-1000<br>1000-1500<br>1500-2000<br>2000-3000<br>>3000 | 5<br>4<br>3<br>2<br>1 | Highly suitable<br>Suitanle<br>Moderate<br>Poor suitable<br>Unsuitable/restricted |
| 3 | Distance from fire station | 0-1000<br>1000-1500<br>1500-2000<br>>2000 | 5<br>4<br>3<br>2 | Highly suitable<br>Suitanle<br>Moderate<br>Poor suitable |

FIG. 1(a)

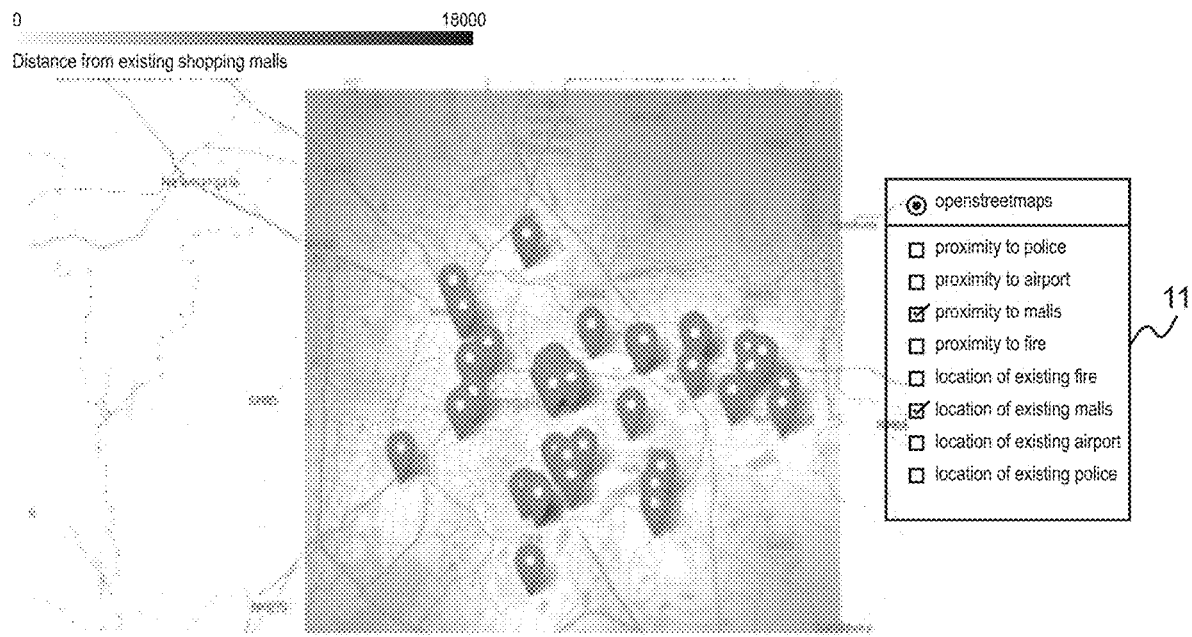

FIG. 1(b)

Buffer analysis Criteria

| | Criteria | Sub-Criteria Distance (m) | Rank | Classification |
|---|---|---|---|---|
| 1 | Distance from Roads | 0-50<br>50-100<br>100-200<br>200-500<br>>500 | 5<br>4<br>3<br>2<br>1 | Highly suitable<br>Suitanle<br>Moderate<br>Poor suitable<br>Unsuitable/restricted |

Population Density Criteria

| Criteria | Sub-Criteria | Rank | Classification |
|---|---|---|---|
| Population Density (SQMI) | <3000<br>3000-5000<br>5000-10000<br>>10000 | 1<br>3<br>4<br>5 | Unsuitable<br>Poor suitable<br>Moderate<br>suitable |

— 13

Land use land cover criteria

| Criteria | Sub-Criteria | Rank | Classification |
|---|---|---|---|
| Land use land cover | Vegetation cover<br>urban built-up<br>barren/unusable<br>open/useable | 1<br>2<br>2<br>5 | Unsuitable<br>Poor suitable<br>Moderate<br>suitable |

| | Criteria | Sub-criteria | Rank | Classification |
|---|---|---|---|---|
| 1 | Existing Shopping Malls | 0-1000<br>1000-1500<br>1500-2000<br>>2000 | 1<br>2<br>3<br>4 | Unsuitable<br>Poor suitable<br>Moderate<br>suitable |
| 2 | Distance from Police Stationt | 0-1000<br>1000-1500<br>1500-2000<br>2000-3000<br>>3000 | 5<br>4<br>3<br>2<br>1 | Highly suitable<br>Suitanle<br>Moderate<br>Poor suitable<br>Unsuitable/restricted |
| 3 | Distance from fire station | 0-1000<br>1000-1500<br>1500-2000<br>>2000 | 5<br>4<br>3<br>2 | Highly suitable<br>Suitanle<br>Moderate<br>Poor suitable |
| 4 | Distance from Roads | 0-50<br>50-100<br>100-200<br>200-500<br>>500 | 5<br>4<br>3<br>2<br>1 | Highly suitable<br>Suitanle<br>Moderate<br>Poor suitable<br>Unsuitable/restricted |
| 5 | Population Density (SQMI) | <3000<br>3000-5000<br>5000-10000<br>>10000 | 1<br>3<br>4<br>5 | Unsuitable<br>Poor suitable<br>Moderate<br>suitable |
| 6 | Land use land cover | Vegetation cover<br>urban built-up<br>barren/unusable<br>open/useable | 1<br>2<br>2<br>5 | Unsuitable<br>Poor suitable<br>Moderate<br>suitable |

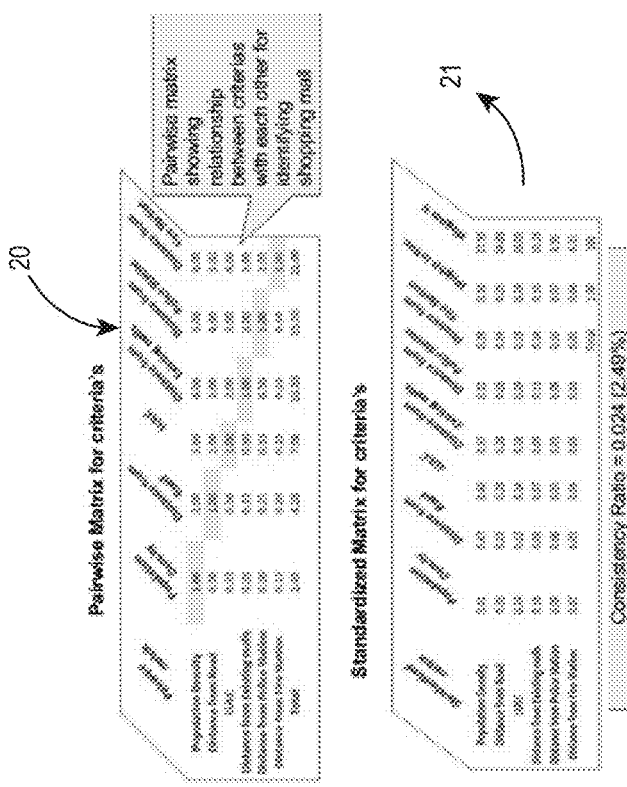

FIG. 2

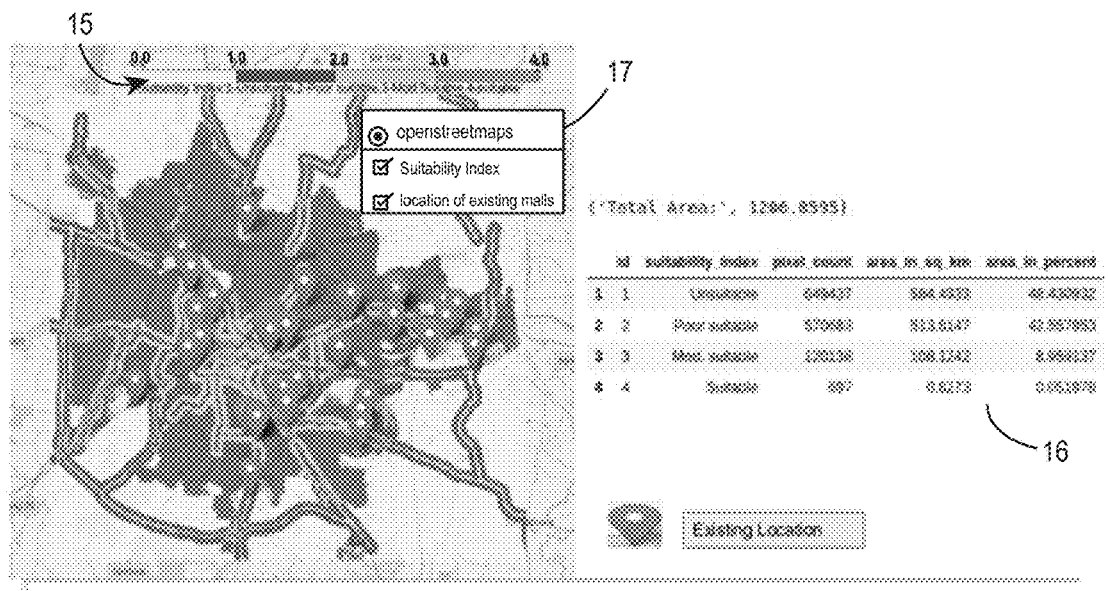

FIG. 2(a)

| S.No. | Criteria | Sub Criteria | Ranking | Classification |
|---|---|---|---|---|
| 1 | LULC | Water/Vegetation/Builtup | 1 | Unsuitable/Restricted |
| | | Barren | 4 | Suitable |
| | | Open land | 5 | Highly Suitable |
| 2 | Soil | Texture class 1 | 1 | Not suitable |
| | | Texture class 2 | 3 | Moderate |
| | | Texture class 3 | 4 | Suitable |
| 3 | Public parks | <200 | 1 | Unsuitable/Restricted |
| | | 200-500 | 2 | Least suitable |
| | | 500-1000 | 3 | Moderate |
| | | >1000 | 4 | Suitable |
| 4 | Water body | <200 | 1 | Unsuitable/Restricted |
| | | 200-500 | 2 | Least suitable |
| | | 500-1000 | 3 | Moderate |
| | | >1000 | 4 | Suitable |
| 5 | Highway | <200 | 1 | Unsuitable/Restricted |
| | | 200-500 | 2 | Least suitable |
| | | 500-1000 | 3 | Moderate |
| | | >1000 | 4 | Suitable |
| 6 | Slope | 0-9 Degree | 5 | Highly suitable |
| | | 10-20 degree | 4 | Suitable |
| | | >20 degree | 1 | Unsuitable |
| 7 | Elevation | 750-1000 m | 4 | Suitable |
| | | <750 and >1000 m | 1 | Unsuitable |
| 8 | Airport | <20000 | 1 | Unsuitable/Restricted |
| | | >20000 | 3 | Suitable |

FIG. 3

COMPUTER-BASED METHOD AND SYSTEM FOR URBAN PLANNING

FIELD OF THE INVENTION

Embodiments described herein in general, concern computer-based method and system for urban planning of a facility. More particularly, the embodiments concern to a fully automated geospatial artificial intelligence (Geo-AI) based method and system for determining suitable sites for a facility for urban planning and providing quantitative assessments with visualization.

CROSS-REFERENCES

Various methods, systems, apparatus, and technical details relating to the present invention are disclosed in the following co-pending applications filed by the applicant or assignee of the present invention. The disclosures of all of these co-pending/granted applications are incorporated herein by cross-reference.

Co-pending application titled "COMPUTER-BASED METHOD AND SYSTEM FOR GEO-SPATIAL ANALYSIS."

Co-pending application titled "COMPUTER-BASED METHOD AND SYSTEM FOR DETERMINING GROUNDWATER POTENTIAL ZONES."

Co-pending application titled "COMPUTER-BASED METHOD AND SYSTEM FOR PREDICTING AND GENERATING LAND USE LAND COVER (LULC) CLASSIFICATION."

BACKGROUND OF THE INVENTION

Unless otherwise indicated herein, the approaches described in this section are not prior art to the claims in this application and are not admitted to be prior art by inclusion in this section.

Urban planning help decision makers to understand the needs of a densely populated area and to determine how construction of a new urban facility will fit in with existing urban infrastructure to meet the regulatory demands. To make reliable decisions regarding the setup of the new urban facilities, various criteria such as social, environmental, and cultural etc. are considered. Based on the criteria, suitable sites to setup the new urban facilities are determined. The conventional computer-based systems for urban planning of the facility are not fully automatic and a user must have good knowledge of geographic information system (GIS) for operating the conventional computer-based systems.

Hence, it is apparent that a need exists for a Geo-spatial artificial intelligence (Geo-AI) based fully automated computer-based method and system with automatic data acquisition and processing for determining the suitable sites for the facility for urban planning and providing quantitative assessments with visualization.

SUMMARY OF THE INVENTION

According to an embodiment, a computer-implemented method for urban planning of a facility is described. The computer-implemented method comprises receiving an input defining a geographic area and a facility type. The computer-implemented method further comprises automatically retrieving a set of satellite images corresponding to the geographic area and automatically retrieving a plurality of data-sets corresponding to the geographic area. The computer-implemented method further comprises automatically determining one or more criteria corresponding to the facility based on the facility type and automatically performing data analysis, on at least one of the set of satellite images and the plurality of data-sets, corresponding to each of the one or more criteria. The computer-implemented method further comprises automatically determining at least one suitable site within the geographic area for the facility based on the data analysis, and automatically presenting a visualization depicting the at least one suitable site in the geographic area.

According to an example, the plurality of data-sets may include at least one of slope data, elevation data, topographic data, existing facilities data, ward wise shapefile, soil texture data, and population density corresponding to the geographic area.

According to an example, the one or more criteria may include at least one of a proximity analysis criterion, slope criterion, elevation criterion, buffer analysis criterion, population density criterion, soil texture criterion, and land use and land cover (LULC) criterion.

According to an example, the one or more criteria may include one or more sub-criteria corresponding to the facility based on the facility type.

According to an example, the one or more criteria include the proximity analysis criterion, and the one or more sub-criteria include distance ranges from one or more existing facilities in the geographic area.

According to an example, the one or more criteria include the buffer analysis criterion, and the one or more sub-criteria include distance ranges from existing linear and polygonal features such as roads, highways, water-bodies, public parks etc. in the geographic area.

According to an example, the one or more criteria include the land use and land cover (LULC) criterion, and the one or more sub-criteria includes vegetation cover, surface water cover, built-up area, barren/open land, and cropland.

According to an example, automatically performing data analysis corresponding to each of the one or more criteria may include automatically computing probable sites for the facility with respect to the one or more sub-criteria.

According to an example, automatically performing data analysis corresponding to each of the one or more criteria may include automatically processing satellite images to compute one or more probable sites with respect to the one or more sub-criteria.

According to an example, automatically performing data analysis corresponding to each of the one or more criteria may include automatically ranking the one or more probable sites for the facility for each of the one or more criteria based on the respective one or more sub-criteria.

According to an example, automatically determining one or more criteria may include automatically determining weights associated to each of the one or more criteria based on the facility type.

According to an example, automatically determining at least one suitable site may include determining the at least one suitable site from the one or more probable sites based on the ranking of the one or more probable sites for each of the one or more criteria and the weights associated to each of the one or more criteria.

According to an example, automatically performing data analysis on the geographic area corresponding to each of the one or more criteria may include automatically generating spatial layers corresponding to each of the one or more criteria.

According to an example, the computer-implemented method may further comprise automatically presenting a visualization depicting each of the spatial layers.

According to an example, automatically determining at least one suitable site within the geographic area for the facility may include determining the at least one suitable site using multi-criteria decision analysis (MCDA) on the data analysis.

According to an example, the multi-criteria decision analysis (MCDA) on the data analysis may include integrating the data analysis corresponding to each of the one or more criteria using weighted sum approach.

According to another exemplary embodiment, a system for urban planning of a facility is described. The system comprises at least one processor and at least one computer readable memory coupled to the at least one processor, and the processor is configured to perform all or some steps of the method described above.

According to another exemplary embodiment, a non-transitory computer readable medium is described. The non-transitory computer readable medium comprises a computer-readable code comprising instructions, which when executed by a processor, causes the processor to perform all or some steps of the method described above.

It is an object of the invention to provide a Geo-spatial artificial intelligence (Geo-AI) based fully automated computer-based method and system with automatic data acquisition and processing for urban planning of the facility where a user does not require any hard knowledge of the geographic information system (GIS) for operating the computer-based system or method. The object is to provide a fully automated computer based method and a system therefore to enable a user to perform urban planning of a facility with minimum input (for example, only the ones related to geographic area, time frame, and facility type for which analysis is to be performed) and arriving directly at the quantitative assessments of the suitable sites and the probable sites for a facility within the geographic area, and that too without the need for the user to have any hard knowledge of the GIS.

It is an object of the invention to link data science with geo-spatial domain knowledge to enable a user with no hard knowledge of GIS to perform the analysis with a single step process.

It is an object of the invention to provide a fully automated computer-based method and system with customization availability for any user.

It is an object of the invention to provide a single input/step process to run the computer-based system or method to arrive at the quantitative analysis of the suitable sites and the probable sites for a facility corresponding to plurality of criteria and the sub-criteria.

It is an object of the invention to automatically provide quantitative statistical measurements of the suitable sites and the probable sites for a facility corresponding to the criteria and the sub-criteria with better visualization depicting the suitable sites for a facility within seconds and with a single click. The visualizations facilitate easily interpretable outcomes with granularity.

It is an object of the invention to provide time efficiency, in that, to provide readable outputs of the urban parameters in most time and energy efficient manner.

It is an object of the invention to provide reduced memory consumption. The satellite images and other data-set pre-processing is performed on the one or more servers. The images do not need to be saved for analytical assessments. The process incurred in the analytics is on cloud.

The summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1(a) shows the proximity analysis criteria and the corresponding sub-criteria;

FIG. 1(b) shows the probable sites for the facility type corresponding to the proximity analysis criteria;

FIG. 2 shows the criteria for determining suitable sites for setting up a shopping mall in the defined geographic area;

FIG. 2(a) shows the suitable sites for setting up the shopping mall in the geographic area;

FIG. 3 shows the criteria for determining suitable sites for landfill sites in the defined geographic area;

DETAILED DESCRIPTION OF THE INVENTION

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

This description is generally drawn, inter alia, to methods, apparatuses, systems, devices, non-transitory mediums, and computer program products implemented as automated tools for geospatial analysis for urban planning of a facility.

The disclosure strives to revolutionize the concept of automatically determining and presenting suitable sites for a urban facility within the geographic area by considering multiple criteria and sub-criteria and using multi-criteria decision analysis (MCDA).

Figure 1:
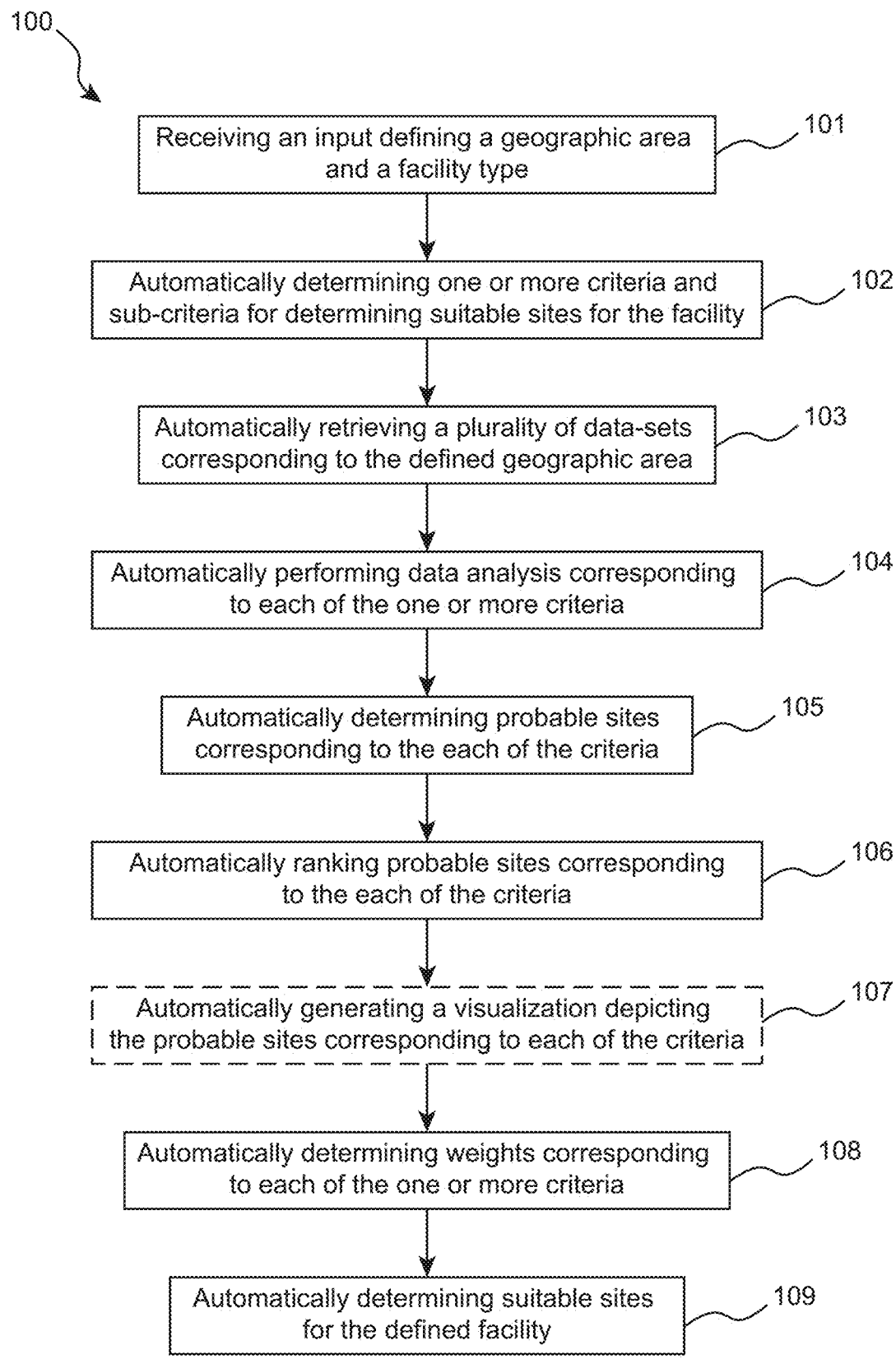
FIG. 1 schematically shows an exemplary flow diagram for an automated method for determining and presenting suitable sites for the facility.

FIG. 1 schematically shows an exemplary flow diagram for an automated method 100 for determining and presenting suitable sites for the facility for urban planning within a geographic area, in accordance with at least some embodiments described herein.

At step 101, an input defining a geographic area and a facility type is received from a user, the input intended towards determination of suitable sites for a facility type for urban planning. In some examples, the input is intended towards determination of suitable sites for setting up the defined facility type within the defined geographic area. In some examples, the input is intended towards determination of suitable site for a new setup of the facility type within the geographic area or an expansion of an existing setup of the facility type within the geographic area. In some examples, an input defining a time frame is received from the user along with the geographic area and the facility type. In some examples, the input defining a geographic area may include such as but not limited to, an extent of a city, a city name, a latitude and/or longitude or any other geographic coordinates of an area. In some examples, the facility type may include any urban facility or urban amenity such as but not limited to, Electric Vehicle Charging Station (EVCS), shopping mall, hotel, educational institution, hospital, petrol pump, airport, landfill site. In some examples, the time frame may include such as but not limited to, a calendar year, a calendar date, or a month. In some examples, the time frame may include a date range where the user provides a start date and an end date.

One skilled in the art will appreciate that the inputs with regard to geographic area, time frame, and facility type has been described for the purpose of illustrations and not limitation. Any number of inputs with regard to geographic area, time frame, and facility type throughout the methods described herein shall be considered within the spirit and scope of the present description.

At step 102, one or more criteria and sub-criteria for determining the suitable sites for the facility based on the facility type are automatically determined. The criteria may be different for the different facility types. For example, the criteria for determining the suitable sites for the education institute may be different than the criteria for determining the suitable sites for the shopping mall. In some examples, the one or more criteria and sub-criteria for determining the suitable sites for the facility based on facility type may be defined by user inputs. In some examples, combination of automatically determined criteria and user inputted criteria may be used. In some examples, user may be allowed to select or discard the one or more automatically determined criteria.

A plurality of criteria such as social, environmental, cultural, etc. are considered to determine suitable sites for the facility based on the facility type. In some examples the one or more criteria may include such as but not limited to at least one of a proximity analysis criterion, slope criterion, elevation criterion, buffer analysis criterion, population density criterion, soil texture criterion, and land use and land cover (LULC) criterion. However, any other criteria, as would be known to a person having ordinary skill in the art, may be considered within the spirit and scope of the present description. In some examples, the one or more criteria may include one or more sub-criteria corresponding to the facility based on the facility type.

Data Acquisition

At step 103, a plurality of data-sets corresponding to the defined geographic area and/or the time frame are automatically retrieved from a plurality of data sources. In some examples, the plurality of data-sets may include such as but not limited to at least one of satellite images, Shuttle Radar Topography Mission (SRTM) Digital Elevation Model (DEM), existing facilities data within the geographic area, ward-wise shapefiles, demographic data, and soil texture data. In some examples, landsat-8 satellite images are retrieved from the one or more servers. However, any other data-set, as would be known to a person having ordinary skill in the art being used or usable for the similar purposes, be considered within the spirit and scope of the present description. In some examples, the plurality of data sources may include such as but not limited to one or more servers, Google Cloud Storage, Amazon AWS S3, Open street Maps (OSM), USGS EROS (Earth Resources Observation and Science), Food and Agriculture organization (FAO), Land and Water Development Division Food and Agriculture Organization (FAO), Rome, remote database, or a local database. In some examples, the retrieved data-sets are presented on an image or map of the geographic area. In some examples, the retrieved data-sets are in shapefile, geojson, GeoTiff, and/or raster format to facilitate use in a variety of image processing applications.

Spatial Data Analysis

At step 104, a plurality of data analysis, on the plurality of retrieved data-sets, is automatically performed corresponding to each of the one or more criteria. In some examples, the data analysis includes performing a plurality of image processing algorithms on the plurality of retrieved data-sets corresponding to each of the one or more criteria. In some examples, the data-analysis on the plurality of retrieved data-sets is performed at pixel level using plurality of image processing algorithms. In some examples, the data analysis corresponding to each of the one or more criteria is used to determine probable sites for the facility type for each of the one or more criteria based on the one or more sub-criteria. In some examples, the probable sites for the facility type includes all the sites that satisfy one or more sub-criteria corresponding to each of the criteria. In some examples, the probable sites for the facility type includes the pixel locations, on an image of the geographic, that satisfy one or more sub-criteria corresponding to each of the criteria.

At step 105, the probable sites that satisfy the one or more sub-criteria corresponding to the each of the criteria are automatically determined based on the respective data analysis.

At step 106, the probable sites corresponding to the each of the criteria are ranked and classified into one or more classes based on the one or more sub-criteria. In some examples, the one or more classes may include but not limited to unsuitable, poor suitable, moderate suitable, suitable, and highly suitable. However, any other form of classification, as would be known to a person having ordinary skill in the art being used or usable for the similar purposes, be considered within the spirit and scope of the present description.

At optional step 107, a visualization depicting the probable sites for the facility type corresponding to each of the criteria is generated and presented on an image or map of the geographic area. In some examples, multiple visualization corresponding to each of the criterion are automatically generated. In some examples, pixel locations of the probable sites corresponding to each of the criteria are presented on an image or map of the geographic area. It is to be understood herein that in some examples, step 107 is optional and the method can directly jump to step 108 from step 106, thereby skipping step 107.

In some examples, the one or more criteria may include the proximity analysis criterion that defines the distance from a particular facility type and the one or more sub-criteria includes distance ranges or thresholds from the existing facilities of the particular facility type in the geographic area. In some examples, the particular facility type may be similar to the defined facility type or different from the defined facility type. In some examples, multiple proximity analysis criteria defining the distance from multiple facility types may be considered. In some examples, the facility types for the proximity analysis criterion may be automatically selected based on the defined facility type. In some examples, the facility types for the proximity analysis criterion may be selected by the user. In some examples, the distance ranges from the facility types may be automatically determined. In some examples, the distance ranges from the facility types may be defined by user inputs. In some example, the existing facilities data of the particular facility type corresponding to the defined geographic area is retrieved from the Open street Map (OSM). In some examples, location of the existing facilities of the particular facility type within the geographic area is presented on an image or map of the geographic area. The data analysis corresponding to the proximity analysis criterion is used to determine the probable sites for the defined facility type based on the one or more sub-criteria. In some examples, the probable sites for the defined facility type are determined based on the distance ranges from the existing facilities of a particular facility type within the geographic area. In some examples, euclidean distance method is used to determine the probable sites for the defined facility type. In some examples, the probable sites for the defined facility and the corresponding euclidean distance from the existing facilities of a particular facility type is presented on an image or map of the geographic area. In some examples, spatial layer or thematic layer representing the probable sites and the corresponding euclidean distance from the existing facilities is generated.

For example, for determining the suitable sites for the shopping mall, the multiple proximity analysis criteria may be considered. For example, distance from the existing shopping malls, distance from the existing police stations, distance from the existing fire stations criterion, etc. may be considered for determining the suitable sites for the shopping mall.

FIG. 1(*a*) shows the proximity analysis criteria and the corresponding sub-criteria. For example, as shown in FIG. 1(*a*), the table 10 represent the three proximity analysis criteria and the sub-criteria corresponding to each criterion defining the distance ranges. For example, the first criterion defines the distance from the existing shopping malls. The sub-criteria corresponding to first criterion defines the distance ranges from the existing shopping malls. The probable sites for setting up the defined facility type are determined for each of the criteria based on the corresponding sub-criteria. The probable sites for each of the criteria are ranked and classified based on the corresponding sub-criteria. For example, as per the first criteria, the probable sites for setting up the defined facility type that fall under the distance range of 0-1000 meters from the existing shopping malls are given rank 1 and are classified as unsuitable sites for the defined facility type. The probable sites for setting up the defined facility type that fall beyond the distance range of more than 2000 meters from the existing shopping malls are given rank 4 and are classified as suitable sites for the defined facility type corresponding to the first criteria.

FIG. 1(*b*) shows the probable sites for the facility type corresponding to the proximity analysis criteria. As an example, FIG. 1(*b*) shows the location of existing shopping malls and euclidean distance of the probable sites for the defined facility type from the existing shopping malls on an image of the geographic area. The probable sites for the set up of the shopping mall and the corresponding euclidean distance from the existing shopping malls are shown at pixel level on an image of the geographic area. In some examples, the check box 11 may be presented to the user. The user may select any of the options, and get a corresponding visualization. For example as shown in FIG. 1(*b*), the location of existing shopping malls and proximity analysis of the malls is selected. In such a scenario, a visualization representing the location of existing shopping malls and the probable sites for the setup of the shopping mall and the corresponding distance from the existing shopping malls is generated.

In some examples, the one or more criteria may include the buffer analysis criterion that defines the distance from existing linear and polygonal features such as roads, water-bodies, and/or public parks etc within the geographic area and the one or more sub-criteria includes distance ranges from the existing linear and polygonal features such as roads, water-bodies, and/or public parks within the geographic area. In some examples, the existing linear and polygonal features such as roads, water-bodies, and/or public parks etc. for the buffer analysis criteria may be automatically selected based on the defined facility type. In some examples, the existing linear and polygonal features such as roads, water-bodies, and/or public parks etc for the buffer analysis criteria may be selected by the user. In some examples, the distance ranges from the existing linear and polygonal features such as roads, water-bodies, and/or public parks etc may be automatically determined. In some examples, the distance ranges from the existing linear and polygonal features such as roads, water-bodies, and/or public parks etc may be defined by user inputs. The data analysis corresponding to the buffer analysis criterion is used to determine the probable sites for the defined facility type based on the one or more sub-criteria. The probable sites are presented by automatically created zones with a certain width around point, line, or region according to a specified buffer distances. For example, if the defined facility is to be built within the distance of 100 meter then data analysis helps to draw a zone, representing the probable sites, for respective distance from the center of the road. In some examples, the probable sites for the defined facility and the corresponding buffer distance from the existing linear and polygonal features such as roads, water-bodies, public parks etc is presented on an image or map of the geographic area. In some examples, spatial layer or thematic layer representing the probable sites and the corresponding buffer distance from the existing linear and polygonal features such as roads, water-bodies, public parks etc is generated.

For example, for determining the suitable sites for the shopping mall, the buffer analysis criteria defining the distance from the roads within the geographic area may be considered.

Figures 1C, 1D:
FIG. 1(c) shows the buffer analysis criterion and the corresponding sub-criteria.
FIG. 1(d) shows the probable sites for the facility type corresponding to the buffer analysis criterion.

FIG. 1(c) shows the buffer analysis criterion and the corresponding sub-criteria. For example, as shown in FIG. 1(c), the table 12 represent the buffer analysis criterion defining distance from the roads and the sub-criteria defining the distance ranges or thresholds from the roads. The probable sites for setting up the defined facility type are determined for the criteria based on the corresponding sub-criteria. The probable sites for the criteria are ranked and classified based on the corresponding sub-criteria. For example, as per the criteria, the probable sites for setting up the defined facility type that fall under the distance range of 0-50 meters from the roads are given rank 5 and are classified as highly suitable sites for the defined facility type. The probable sites for setting up the defined facility type that fall beyond the distance range of more than 500 meters from the roads are given rank 1 and are classified as unsuitable sites for the defined facility type.

FIG. 1(d) shows the probable sites for the facility type corresponding to the buffer analysis criteria. As an example, FIG. 1(d) shows the probable sites for the defined facility type and corresponding buffer distance from roads.

In some examples, the one or more criteria may include the slope criterion and the elevation criterion. The sub-criteria may include slope and/or elevation ranges or thresholds for determining the suitable sites for the defined facility type. The slope and elevation of the defined geographic area are important criteria for determining the suitable sites for the defined facility type. In such an example, the SRTM digital elevation model (DEM) corresponding to the defined geographic area and the time frame is automatically retrieved from the one or more servers. In some examples, the retrieved digital elevation model is presented on an image or map of the geographic area. In some examples, spatial or thematic layer representing the DEM for the defined geographic area is generated.

In some examples, the slope and elevation corresponding to the defined geographic area are automatically computed from the retrieved DEM. In some examples, the slope and/or elevation corresponding to the defined geographic area is presented on an image or map of the geographic area. In some examples, spatial or thematic layer representing the slope and/or elevation for the defined geographic area is generated.

Figure 1E:
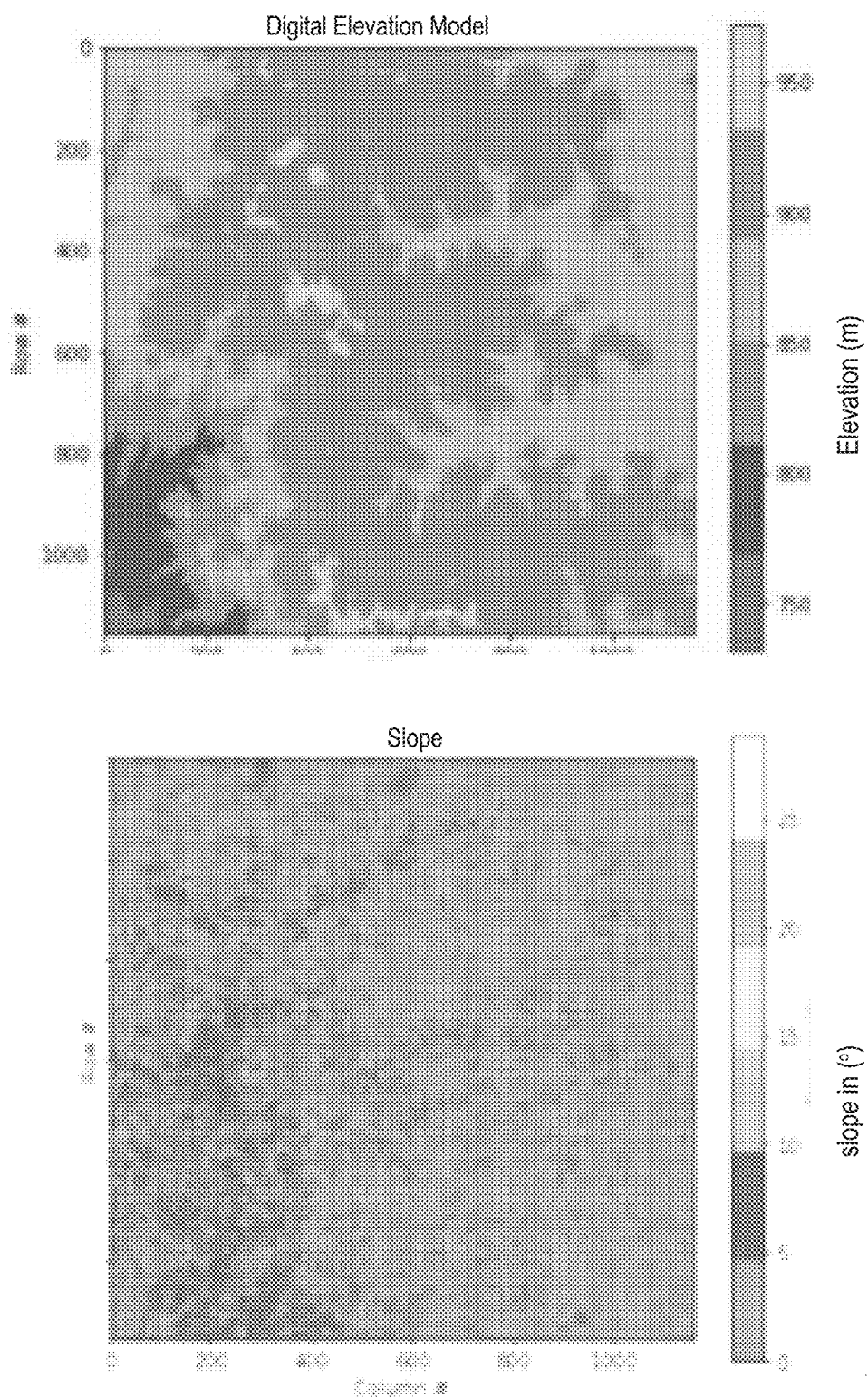
FIG. 1(e) shows the digital elevation model and the slope of the geographic area.

As an example, FIG. 1(e) shows the digital elevation model and the slope of the geographic area on an image of the geographic area.

In some examples, the one or more criteria may include the population density criterion. In such a scenario, the required data-set of ward wise population density shapefiles may be automatically retrieved from country level or City level official sites corresponding to the defined geographic area. In some examples, the demographic data is defined by user inputs. The sub-criteria may include population density ranges or thresholds. The data analysis corresponding to the population density criterion is used to determine the probable sites for the defined facility type based on the sub-criteria. The population density plays an important role to identify high population areas and low population areas. The suitable sites for setting up the defined facility are usually considered to be near the densely populated areas of the geographic area for well functioning and supply of resources.

For example, for determining the suitable sites for the shopping mall, the population density criteria may be considered.

Figures 1F, 1G:
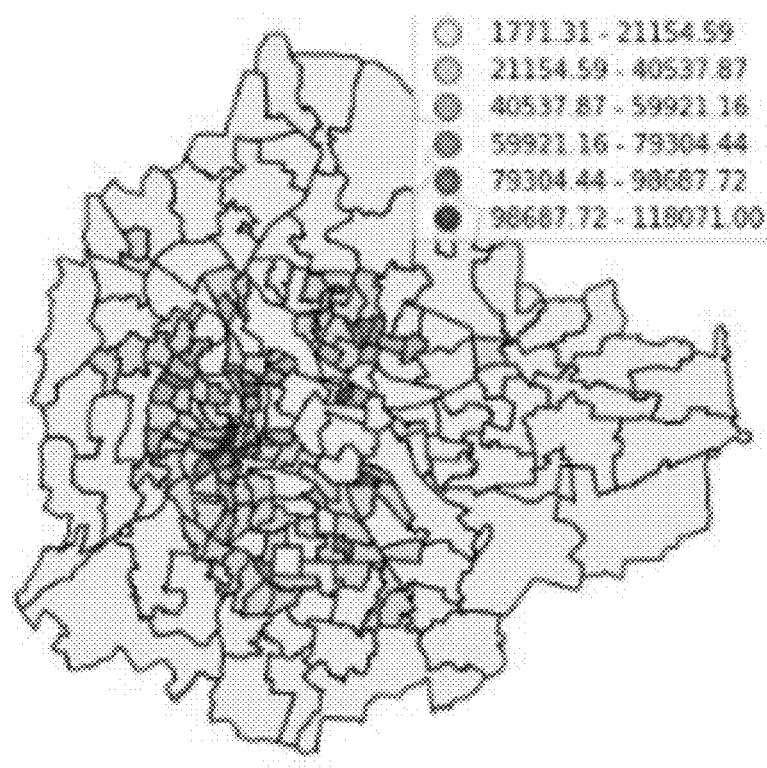
FIG. 1(f) shows the population density criterion and the corresponding sub-criteria.
FIG. 1(g) shows the ward-wise population density of the geographic area.

FIG. 1(f) shows the population density criterion and the corresponding sub-criteria. For example, as shown in FIG. 1(f), the table 13 represent the population density criterion and the one or more sub-criteria defining the one or more population density ranges or thresholds in per square miles (sq.mi). For example, as per the criteria, the sites, with population density of less than 3000, within the geographic area are ranked 1 and are classified as unsuitable sites for the defined facility type. The sites, with population density greater than 10000, within the geographic area are ranked 5 and are classified as suitable sites for the defined facility type.

As an example, FIG. 1(g) shows the ward-wise population density of the geographic area.

In some examples, the one or more criteria may include the soil texture and the one or more sub-criteria includes soil type, soil components, and texture and slope classes. In some examples, the soil texture data is extracted from soil map. In some examples, the soil map corresponding to the defined geographic area is retrieved from the Land and Water Development Division, Food and Agriculture Organization (FAO), Rome. In some examples, the soil map is retrieved in vector and/or raster formats to facilitate use in a variety of image processing applications. The retrieved data contains dominant soil type, soil components, and texture and slope classes of each mapping unit. In some examples, the soil texture is used as one of the criteria in determining suitable sites for the landfill sites. In some examples, the texture classes defined in the one or more sub-criteria, corresponding to the soil texture criteria, reflect the relative proportions of clay, silt and sand in the soil. The three textural classes used in the one or more sub-criteria may include but not limited to coarse, medium, and fine. In some examples, the coarse texture class includes sands, loamy sands and sandy loams with less than 18 percent clay and more than 65 percent sand. They have low runoff potential and high infiltration rates. In some examples, the medium texture includes sandy loams, loams, sandy clay loams, silt loams, silt, silty clay loams and clay loams with less than 35 percent clay and less than 65 percent sand. The sand fraction may be as high as 82 percent if a minimum of 18 percent clay is present. They have a moderate to high infiltration rate when thoroughly wet. In some examples, the fine texture class includes clay, silty clays, sandy clays, clay loams, with more than 35 percent clay. They have highest runoff potential and very low infiltration rates. In some examples, the texture classes are considered based on infiltration rates.

Figures 1H, 1I:
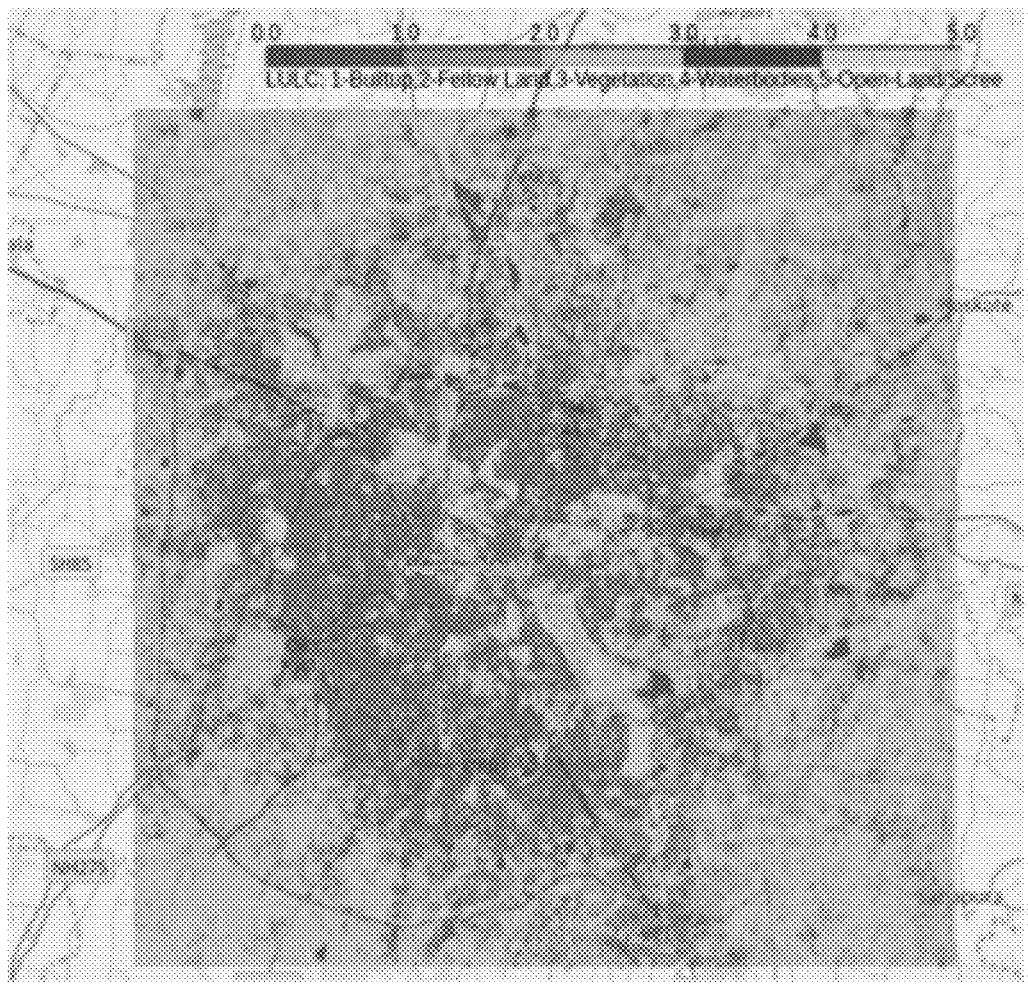
FIG. 1(h) shows the land use and land cover (LULC) criterion and the corresponding sub-criteria.
FIG. 1(i) shows the land use and land cover (LULC) classification map corresponding to the geographic area.

In some examples, the one or more criteria may include the land use land cover (LULC) criteria. The one or more sub-criteria may include but not limited to vegetation cover, surface water cover, built-up area, barren/open land, and cropland (agriculture+current fallow). In some examples, the barren land includes permanent fallow land. However, any other form of sub-criteria, as would be known to a person having ordinary skill in the art being used or usable for the similar purposes, be considered within the spirit and scope of the present description. The data analysis corresponding to the LULC criterion includes classification of surface characteristics of the defined geographic area into one or more classes based on the one or more sub-criteria. In some examples, the satellite images corresponding to the defined geographic area are automatically retrieved from the one or more servers. In some examples, the landsat satellite images corresponding to the defined geographic area are retrieved from the one or more servers. In some examples, the retrieved satellite images of the geographic area are given as input to trained deep learning model to classify the images into one or more classes based on the one or more sub-criteria. In some examples, the trained deep learning model takes satellite images of the defined geographic area as input and generates an output classified map representing the one or more classes corresponding to the one or more sub-criteria. For example, FIG. 1(i) shows the classified map for the defined geographic area. As shown in FIG. 1(i), each pixel of the satellite image has been classified into one of the classes including but not limited to vegetation cover, built-up area, fallow land, surface water cover (represented by waterbodies) and open land based on the one or more sub-criteria.

In some examples, the probable sites for the defined facility type that satisfy the one or more sub-criteria corresponding to the criteria are automatically determined based on the respective data analysis. The probable sites corresponding to the each of the criteria are ranked and classified into one or more classes based on the one or more sub-criteria.

For example, for determining the suitable sites for the shopping mall, the LULC criteria the corresponding sub-criteria may be considered. For example, as shown in FIG. 1(h), the table 14 represent the LULC criteria and the corresponding sub-criteria including but not limited to vegetation cover, built-up area, barren land, and open land for determining the suitable sites for the shopping mall. The probable sites for setting up the shopping mall that fall under the vegetation cover are ranked 1 and are classified as unsuitable sites for the shopping mall. The probable sites for setting up the shopping mall that fall under the open land are ranked 5 and are classified as suitable sites for the shopping mall.

At step 108, weights corresponding to each of the one or more criteria are automatically determined. In some examples, the weights corresponding to each of the one or more criteria are automatically determined by using Analytical Hierarchy Process (AHP). The Analytic Hierarchy Process (AHP) computes weights corresponding to each of the one or more criteria by using pairwise comparisons. Each criterion is compared with respect to the each other criterion and the weight is assigned to each criterion based on the comparison. The weight indicates how many times more important a criterion is with respect to each other criterion for determining the suitable sites for the defined facility type. In some examples, the pairwise comparison matrix showing the relationship between the one or more criteria is automatically generated. In some examples, Consistency Ratio (CR) is calculated to measure how consistent the judgments have been relative to large samples of purely random judgments. In some examples, a Consistency Ratio (CR) is calculated by dividing the consistency index (CI) for the set of judgments by the Random Index (RI). The random index (RI) is the consistency index (CI) for a randomly filled matrix. In some examples, values of the RI are predefined based on selection of the number of criteria. In some examples, the CR should be less than 0.1 (10%) for making decisions consistent and acceptable. If the CR exceeds 0.1, the set of judgments may be too inconsistent to be reliable and the decision maker has to revise the decisions. If the CR equals to 0, the judgments are perfectly consistent. In some examples, standardized matrix representing the weights corresponding to each of the criteria is automatically computed.

At step 109, suitable sites for the defined facility are automatically determined using multi-criteria decision analysis (MCDA). In some examples, suitable sites for the defined facility are automatically determined based on the ranking of the one or more probable sites for each of the one or more criteria and the weights associated to each of the one or more criteria. In some examples, the spatial or thematic layers representing the probable sites for the defined facility corresponding to each of the one or more criteria are integrated using weighted sum approach using analytical hierarchical process (AHP). In some examples, this integration of the spatial layers and the corresponding probable sites is performed at pixel level. The probable sites corresponding to each of the criteria are integrated using the weighted sum approach based on the based on the ranking of the one or more probable sites for each of the one or more criteria and the weights associated to each of the one or more criteria. The integrated probable sites are classified into one or more classes. In some examples, the classes may include unsuitable, poor suitable, moderate suitable, suitable and highly suitable. However, any other form of classification, as would be known to a person having ordinary skill in the art being used or usable for the similar purposes, be considered within the spirit and scope of the present description.

The integrated probable sites and corresponding classification are presented on an image or map of the geographic area.

FIG. 2 shows the criteria for determining suitable sites for setting up a shopping mall in the defined geographic area. In some examples, the one or more criteria for determining suitable sites for the shopping mall may include, but not limited to, the distance from the existing shopping malls within the geographic area, distance from roads within the geographic area, distance from existing police-stations within the geographic area, distance from existing fire-stations within the geographic area, population density, land use land cover type. However, any other form of criteria, as would be known to a person having ordinary skill in the art being used or usable for the similar purposes, be considered within the spirit and scope of the present description. The table 14 shows the criteria and sub-criteria corresponding to each criterion for determining the suitable sites for shopping mall. The probable sites corresponding to each of the criteria are determined and ranked on the scale of 1 to 5. The probable sites corresponding to each of the criteria are classified into one or more classes based on the one or more sub-criteria. In some examples, the one or more classes may include but not limited to unsuitable, poor suitable, moderate suitable, suitable, and highly suitable. The pairwise matrix 20 showing the relationship of each criterion with respect to each other criterion is automatically computed. In some examples, standardized matrix 21 representing the weights corresponding to each of the criteria is automatically computed.

The suitable sites for setting up the shopping malls are automatically determined using MCDA by integrating the probable sites corresponding to each criteria based on the corresponding ranks and the weight using the AHP. In some examples, the integrated probable sites are classified into five classes including unsuitable sites, poor suitable sites, moderate suitable sites, suitable sites and highly suitable sites. FIG. 2(a) shows the suitable sites for setting up the shopping mall in the geographic area. As shown in FIG. 2(a), the integrated probable sites are classified into one or more classes including unsuitable sites, poor suitable sites, moderate suitable sites, and suitable sites. For the purpose of illustration only four classes have been shown in the figure. However, any form of classes, as would be known to a person having ordinary skill in the art being used or usable for the similar purposes, be considered within the spirit and scope of the present description. The suitability index 15 represent the classification. The table 16 shows the classification of the sites, corresponding pixels covered by sites of each class, area in square km covered by sites of each class, percentage of total area covered by sites of each class. For example, the pixel count covered by sites that are suitable for setting up the defined facility is 697 and the percentage area of the total geographic area covered by sites that are suitable for setting up the defined facility is 0.052 percent. In some examples, the check-box 17 can be presented to the user. The user can select the location of the existing shopping malls and get a visualization of the existing shopping malls in the geographic area and get the analysis of suitable sites for setting up a new shopping mall with respect to existing shopping malls.

FIG. 3 shows the criteria for determining suitable sites for landfill sites within the defined geographic area. One of the most crucial steps in waste management is selection of the suitable sites for landfill sites, as multiple factors and regulations have to be considered so that hazards to environment and public health can be minimized. In some examples, the one or more criteria for determining the suitable sites for the landfill sites may include, but not limited to, the land use land cover (LULC), soil texture, distance from existing public parks within the geographic area, distance from existing water bodies within the geographic area, distance from existing highways within the geographic area, slope criterion, elevation criterion, distance from existing airports within the geographic area. However, any other form of criteria, as would be known to a person having ordinary skill in the art being used or usable for the similar purposes, be considered within the spirit and scope of the present description. The table shows the criteria and sub-criteria corresponding to each criterion for determining the suitable sites for the landfill sites. The probable sites corresponding to each of the criteria are determined and ranked on the scale of 1 to 5. The probable sites corresponding to each of the criteria are classified into one or more classes based on the one or more sub-criteria. In some examples, the one or more classes may include but not limited to unsuitable, poor suitable, moderate suitable, suitable, and highly suitable.

Figure 3A:
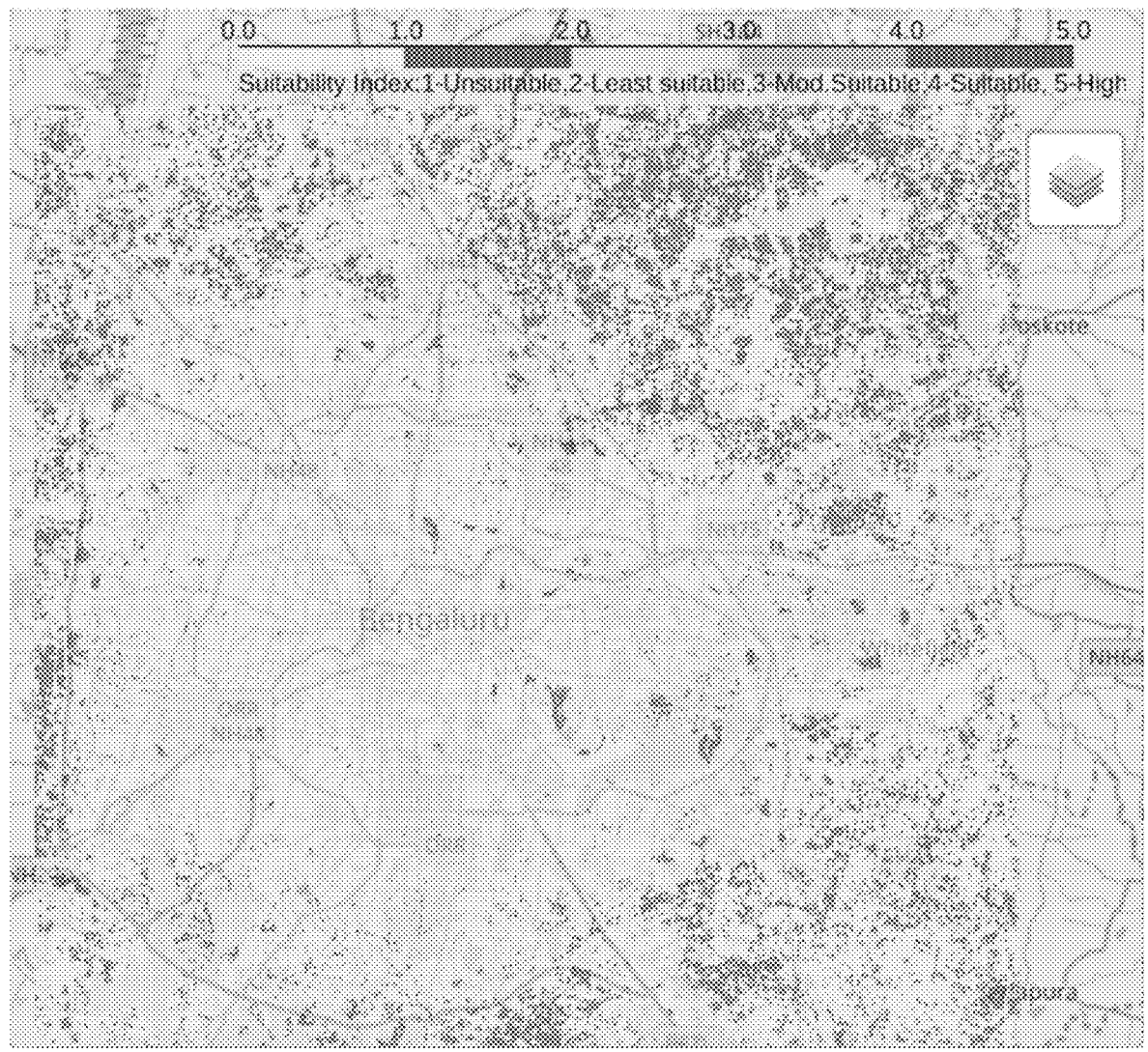
FIG. 3(a) shows the suitable sites for the landfill sites in the geographic area.

The suitable sites for the landfill sites are automatically determined using MCDA by integrating the probable sites corresponding to each criteria based on the corresponding ranks and the weight using the AHP. FIG. 3(a) shows the suitable sites for the landfill sites in the geographic area. As shown in FIG. 3(a), the integrated probable sites are classified into one or more classes including unsuitable, least/poor suitable, moderate suitable, suitable, and highly suitable. The table shows the classification of the sites, corresponding pixels covered by sites of each class, area in square km covered by sites of each class, percentage of total area covered by sites of each class.

In some examples, not shown, a set of satellite images corresponding to the defined geographic area and the time frame are automatically selected and retrieved from the Amazon AWS S3 server (along with step 103 of method 100). In some examples, landsat-8 satellite images are retrieved from the Amazon AWS S3 server. In some examples, the latitude and/or longitude values of the defined geographic area are converted into pixel locations. In some examples, the satellite images are stored in tiled form on the one or more servers. The satellite images are divided into multiple tiles in UTM/WGS84 projection. Each tile has its own projection information which is used for conversion of a spherical surface to a square tile and vice versa. In some examples, a separate list of all the projection information of all the tiles is automatically created that is used for converting the latitude and/or longitude values into pixel locations. In some examples, geo-keys such as EPSG and/or UTM Zone corresponding to the defined geographic area are automatically generated.

In some examples, the tile containing the defined geographic area corresponding to the defined time frame is automatically selected and retrieved from the one or more servers. In some examples, the defined geographic area lies around tile edges and fall on multiple tiles. In such a scenario, the best tile is selected and retrieved from the one or more servers to maintain the uniformity. In some examples, the multiple tiles containing the defined geographic area are merged together and the merged tiles are retrieved from the one or more servers for further processing.

In some examples, a set of satellite images corresponding to the defined geographic area and the time frame are automatically selected and bounding box containing the defined geographic area within the satellite images is automatically computed. The image is cropped around the edges of the bounding box and the cropped image is automatically retrieved from the one or more servers.

In some examples, the bounding box falling under the UTM zones corresponding to the defined geographic area are automatically selected and corresponding tiles are automatically retrieved from the one or more servers.

In some examples, the size of the tiles of the satellite images is very large usually in megabytes (MB). In such a scenario, the raster data of the satellite images is optimized by converting the raster data into a format that is handled by using standard Python libraries.

In some examples, the landsat level-1 product data corresponding to the defined geographic area and the time frame are automatically retrieved from the one or more servers. In some examples, geometrically corrected satellite images corresponding to the defined geographic area and time frame are automatically retrieved from the one or more servers. In some examples, the landsat level-1 Precision and Terrain (L1TP) corrected product data corresponding to the defined geographic area and the time frame are automatically retrieved from the one or more servers. The level-1 Precision and Terrain (L1TP) corrected product data is radiometrically calibrated and orthorectified using ground control points (GCPs) and digital elevation model (DEM) data to correct for relief displacement. The highest quality landsat level-1 products are suitable for pixel-level time series analysis.

In some examples, the satellite images having less cloud coverage are automatically selected and retrieved from the one or more servers. Cloud cover may obscure the ground underneath it and affects the satellite images which hampers the analysis results. In some examples cloud cover may include such as but not limited to clouds, atmospheric obstructions, such as smoke, snow, haze, or smog, or combinations thereof. In some examples, cloud based filters are used to automatically select those satellite images which have less cloud coverage. In some examples, only those satellite images which have less cloud coverage are automatically selected and retrieved from the one or more servers. In some examples, best satellite images with at most 5 percent cloud coverage corresponding to the defined geographic area and the time frame are automatically selected and retrieved from the one or more servers. In some examples, best satellite images with at most 7 percent, at most 10 percent, at most 15 percent, at most 20 percent, at most 25 percent, at most 30 percent, at most 35, or at most 40 percent cloud coverage corresponding to the defined geographic area and the time frame are automatically selected and retrieved from the one or more servers.

In some examples, cloud free satellite images are automatically selected and retrieved from the one or more servers.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
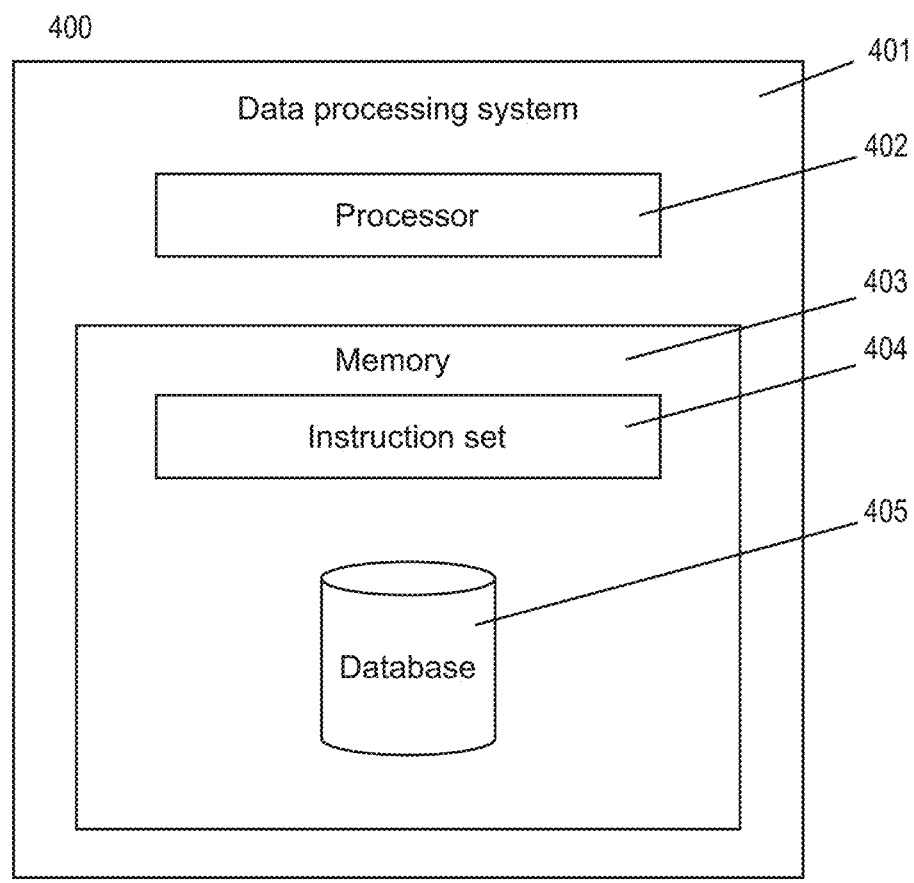
FIG. 4 schematically shows a block diagram of an illustrative example of a system for determining and presenting suitable sites for the facility.

FIG. 4 schematically shows a block diagram of an illustrative example of a system 400 for geospatial analysis for determining and presenting suitable sites for the facility type, arranged in accordance with at least some embodiments described herein. As depicted in FIG. 4, the system 400 includes a data processing system 401, which comprises at least one processor 402 and at least one memory 403. The memory 403 comprises an instruction set storage 404 and a database 405. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computers and associated components.

In some examples, the data processing system 401, with use of the processor 402, may be configured, based on execution of one or more instructions stored on the instruction set storage 404 and/or database 405, to perform some or all the operations of the methods 100 as detailed above.

It is to be noted herein that various aspects and objects of the present invention described above as methods and processes should be understood to an ordinary skilled in the art as being implemented using a system that includes a computer that has a CPU, display, memory and input devices such as a keyboard and mouse. According to an embodiment, the system is implemented as computer readable and executable instructions stored on a computer readable media for execution by a general or special purpose processor. The system may also include associated hardware and/or software components to carry out the above described method functions. The system is preferably connected to an internet connection to receive and transmit data.

The term "computer-readable media" as used herein refers to any medium that provides or participates in providing instructions to the processor of the computer (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner Thus, scope of the invention is indicated by the following claims rather than by the above description.

What is claimed is:

1. A computer-implemented method for urban planning of a facility, said method comprising:
   receiving an input defining a geographic area and a facility type;
   automatically retrieving a set of satellite images corresponding to the geographic area;
   automatically retrieving a plurality of data-sets corresponding to the geographic area;
   automatically determining one or more criteria corresponding to the facility based on the facility type;
   automatically performing data analysis, on at least one of the set of satellite images and the plurality of data-sets, corresponding to each of the one or more criteria;
   automatically determining at least one suitable site within the geographic area for the facility based on the data analysis; and
   automatically presenting a visualization depicting the at least one suitable site in the geographic area.

2. The computer-implemented method of claim 1, wherein the plurality of data-sets includes at least one of slope data, elevation data, topographic data, existing facilities data, ward wise shapefile, population density, and soil texture data corresponding to the geographic area.

3. The computer-implemented method of claim 1, wherein the one or more criteria include at least one of a proximity analysis criterion, slope criterion, elevation criterion, buffer analysis criterion, population density criterion, soil texture criterion, and land use and land cover (LULC) criterion.

4. The computer-implemented method of claim 3, wherein the one or more criteria include one or more sub-criteria corresponding to the facility based on the facility type.

5. The computer-implemented method of claim 4, wherein the one or more criteria include the proximity analysis criterion, and the one or more sub-criteria include distance ranges from one or more existing facilities in the geographic area.

6. The computer-implemented method of claim 4, wherein the one or more criteria include the buffer analysis criterion, and the one or more sub-criteria include distance ranges from existing linear and polygonal features such as roads, water-bodies, public parks etc in the geographic area.

7. The computer-implemented method of claim 4, wherein the one or more criteria include the land use and land cover (LULC) criterion, and the one or more sub-criteria includes vegetation cover, surface water cover, built-up area, barren/open land, and cropland.

8. The computer-implemented method of claim 4, wherein said automatically performing data analysis corresponding to each of the one or more criteria includes automatically computing probable sites for the facility with respect to the one or more sub-criteria.

9. The computer-implemented method of claim 7, wherein said automatically performing data analysis corresponding to each of the one or more criteria includes automatically processing satellite images to compute one or more probable sites with respect to the one or more sub-criteria.

10. The computer-implemented method of claim 8, wherein said automatically performing data analysis corresponding to each of the one or more criteria includes automatically ranking the one or more probable sites for the facility for each of the one or more criteria based on the respective one or more sub-criteria.

11. The computer-implemented method of claim 10, wherein said automatically determining one or more criteria includes determining weights associated to each of the one or more criteria based on the facility type, and wherein said automatically determining at least one suitable site includes determining the at least one suitable site from the one or more probable sites based on the ranking of the one or more probable sites for each of the one or more criteria and the weights associated to each of the one or more criteria.

12. The computer-implemented method of claim 1, wherein said automatically performing data analysis on the geographic area corresponding to each of the one or more criteria includes automatically generating spatial layers corresponding to each of the one or more criteria, and the method further comprises automatically presenting a visualization depicting each of the spatial layers.

13. The computer-implemented method of claim 1, wherein said automatically determining at least one suitable site within the geographic area for the facility includes determining the at least one suitable site using multi-criteria decision analysis (MCDA) on the data analysis.

14. The computer-implemented method of claim 13, wherein the multi-criteria decision analysis (MCDA) on the data analysis includes integrating the data analysis corresponding to each of the one or more criteria using weighted sum approach.

15. A system for urban planning of a facility, said system comprising:
at least one processor;
a memory that is coupled to the at least one processor and that includes computer-executable instructions, wherein the at least one processor, based on execution of the computer-executable instructions, is configured to:
receive an input defining a geographic area and a facility type;
retrieve a set of satellite images corresponding to the geographic area;
retrieve a plurality of data-sets corresponding to the geographic area;
determine one or more criteria corresponding to the facility based on the facility type;
perform data analysis, on at least one of the set of satellite images and the plurality of data-sets, corresponding to each of the one or more criteria;
determine at least one suitable site within the geographic area for the facility based on the data analysis; and
present a visualization depicting the at least one suitable site in the geographic area.

16. The system of claim 15, wherein the plurality of data-sets includes at least one of slope data, elevation data, topographic data, existing facilities data, ward wise shape-file, population density, and soil texture data corresponding to the geographic area.

17. The system of claim 15, wherein the one or more criteria include at least one of a proximity analysis criterion, slope criterion, elevation criterion, buffer analysis criterion, population density criterion, soil texture criterion, and land use and land cover (LULC) criterion.

18. The system of claim 17, wherein the one or more criteria include one or more sub-criteria corresponding to the facility based on the facility type.

19. The system of claim 18, wherein the one or more criteria include the proximity analysis criterion, and the one or more sub-criteria include distance ranges from one or more existing facilities in the geographic area.

20. The system of claim 18, wherein the one or more criteria include the buffer analysis criterion, and the one or more sub-criteria include distance ranges from existing linear and polygonal features such as roads, water-bodies, public parks etc in the geographic area.

21. The system of claim 18, wherein the one or more criteria include the land use and land cover criterion, and the one or more sub-criteria includes vegetation cover, surface water cover, built-up area, barren/open land, and cropland.

22. The system of claim 18, wherein the at least one processor being configured to perform data analysis corresponding to each of the one or more criteria includes the at least one processor being configured to:
compute probable sites for the facility with respect to the one or more sub-criteria; and
rank the one or more probable sites for the facility for each of the one or more criteria based on the respective one or more sub-criteria.

23. The system of claim 22, wherein the at least one processor being configured to determine one or more criteria includes the at least one processor being configured to determine weights associated to each of the one or more criteria based on the facility type, and wherein the at least one processor being configured to determine at least one suitable site includes the at least one processor being configured to determine the at least one suitable site from the one or more probable sites based on the ranking of the one or more probable sites for each of the one or more criteria and the weights associated to each of the one or more criteria.

24. The system of claim 15, wherein the at least one processor being configured to determine at least one suitable site within the geographic area for the facility includes the at least one processor being configured to determine the at least one suitable site using multi-criteria decision analysis (MCDA) on the data analysis, wherein the multi-criteria decision analysis (MCDA) on the data analysis includes integrating the data analysis corresponding to each of the one or more criteria using weighted sum approach.

25. A non-statutory computer-readable medium that comprises computer-executable instructions that, based on execution by at least one processor of a computing device that includes memory, cause the computing device to perform one or more steps of the method of claim 1.

* * * * *